Jan. 13, 1925.
W. B. DOE
ROOFING BOARD
Filed Dec. 8, 1923
1,523,105
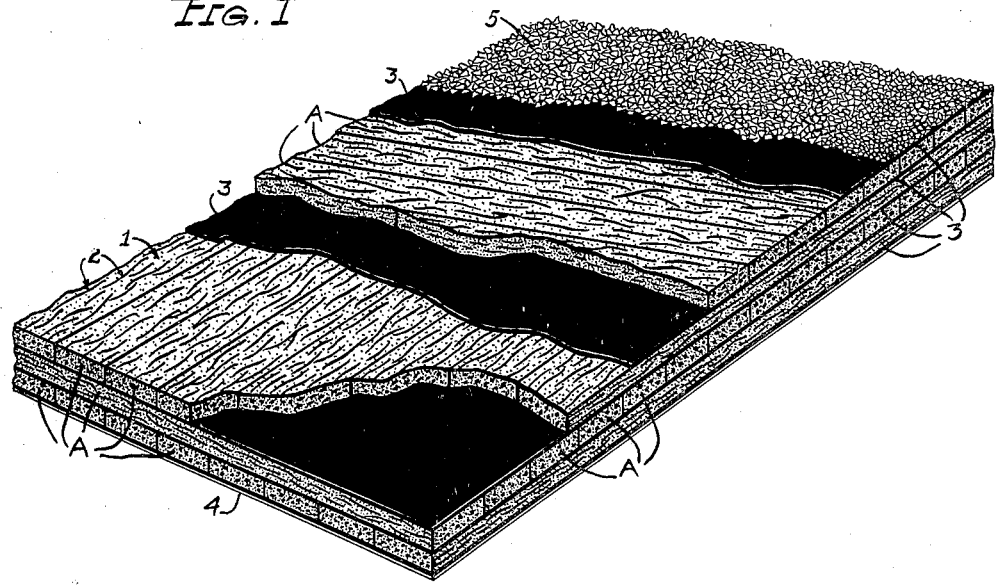
Fig. I
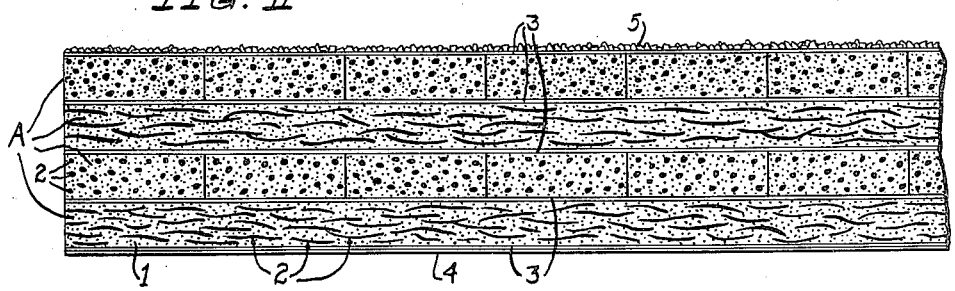
Fig. II
INVENTOR
WILLIAM B. DOE
BY Cook & McCauley
ATTORNEYS Patented Jan. 13, 1925.

1,523,105

UNITED STATES PATENT OFFICE.

WILLIAM B. DOE, OF JACKSONVILLE, FLORIDA, ASSIGNOR OF ONE-HALF TO EDWIN W. GROVE, OF ST. LOUIS, MISSOURI.

ROOFING BOARD.

Application filed December 8, 1923. Serial No. 679,321.

*To all whom it may concern:*

Be it known that I, WILLIAM B. DOE, a citizen of the United States of America, a resident of Jacksonville, in the county of Duval, State of Florida, have invented certain new and useful Improvements in Roofing Boards, of which the following is a full, clear, and exact description, reference being had to the accompanying drawing, forming a part of this specification.

This invention relates to improvements in roofing boards, and the like, one of the objects being to produce an inexpensive composite board having the properties of roofing lumber covered with prepared sheet roofing. The new board is adapted to serve as sheathing lumber for the roof or sides of a building, and it is provided with gritty surfacing material corresponding to the material ordinarily used on sheet roofing.

One of the objects of the present invention is to convert palmetto trees into valuable boards, particularly adapted for use as roofing material, although the invention is not limited to such use, for the composite boards may be used as sheathing in the sides of a building and in other places where it is desirable to use a strong, stiff board made of light material with a gritty surface. Palmetto wood consists of a mass of strong coarse fibers in a body of soft pith, the fibers being lengthwise of the tree, so an individual board of this wood can be readily broken in lines lengthwise of the fibers. More than one-half of the body of the wood is formed by the soft pith, and the only other constituent is a mass of coarse, hard fibers. The palmetto trees can be readily cut into boards, or strips, having rough surfaces formed partly by the pith and partly by the fibers which lie in the form of irregular ridges and sharp splinters at the surface of the pith.

Owing to its peculiar characteristics, and its lack of strength, this wood is ordinarily considered as a waste product not having any value to justify the clearing of large tracts of very fertile land on which the palmetto trees grow.

According to the preferred form of the invention, the weak mass of absorbent pith and coarse fibers is converted into strong and stiff waterproof boards having a gritty surface, and adapted to be used as a substitute for wooden boards and prepared sheet roofing. The rough surface with its splinter-like projections is preferably covered by a coating of waterproof material with gritty surfacing material adhering thereto at one side of the board, and a sheet of paper may be used to cover the other side. The palmetto wood is very light, and this is advantageous in the transportation and installation of the boards. A high degree of strength is obtained by arranging the strips of palmetto wood in plies, with the fibers in one ply at an angle to those in another ply, and the several plies can be conveniently cemented to each other to produce large boards which may be easily and quickly assembled in a building structure.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a perspective view of a composite board embodying the features of this invention, some of the parts being broken away to expose the several elements of the board.

Fig. II is an enlarged view of a portion of the board.

As an illustration of one form of the invention I have shown a board comprising four plies of palmetto wood cemented to each other and covered on one side with gritty surfacing material and on the other side with thin sheet material, such as paper.

Palmetto trees are not large in diameter, but it is desirable to produce large boards and thereby reduce the labor of erecting the structure in which the boards are used. The palmetto wood is very light, so the large boards can be easily handled.

Each ply comprises strips A of soft pithy material 1 with coarse hard fibers 2 formed therein and extending lengthwise thereof. The strips A in each ply are approximately parallel with each other, but at an angle to the strips in other plies. In the form shown, the strips of each ply lie at a right angle to the strips in another ply. Consequently, the strong, tough fibers in each ply lie at an angle to the fibers in another ply, and although each individual strip of pith and fibers is weak and flexible, the several strips are combined to produce a large, strong board. Each strip may be relatively thin, for instance, one-fourth of an inch, or less, in thickness, so the total thickness of the composite board may conform to that of an ordinary wooden sheathing board. However, the new board is lighter and stronger than ordinary wood, and it has the insulating properties of the soft pith.

When a palmetto log is cut into strips, portions of the fibers are exposed at the surfaces of the pith, and sharp splinters are formed by some of the projecting portions of the fibers. Both sides of each strip are, therefore, preferably coated to cover the rough surfaces, and a suitable adhesive material may be used for this purpose. It is also desirable to coat the absorbent pith with a waterproof substance. Asphaltic material is an inexpensive substance having all of these properties, and the strips can be readily covered with asphalt to provide the coating material 3.

After the coated strips A have been assembled, they will be securely united by the cementitious asphaltic material, and a sheet of paper 4 may be applied to the coating at one side of the board, so as to provide a smooth, non-adhesive surface. The coating at the other side is covered by gritty surfacing material 5, such as crushed shells or crushed slate, which adheres to the asphaltic material.

The several inexpensive elements of the composite board are thus cemented to each other, so as to convert the weak pith and coarse fibers into a strong, durable, moisture-proof board, with gritty surface on one side.

I claim:

1. As a new article of manufacture, a board comprising soft pithy material with coarse hard fibers therein, and gritty surfacing material adhering to the mixture of fibers and pithy material.

2. As a new article of manufacture, a board comprising plies of pithy palmetto wood, each ply consisting of hard coarse fibers in soft pithy material, cementitious material uniting the plies, and gritty surfacing material adhering to the outer face of the mixture of fibers and pithy material in one of the plies.

3. As a new article of manufacture, a board comprising plies of palmetto wood, each ply comprising strips of pithy material with coarse fibers formed therein and extending lengthwise thereof, the strips in each ply being approximately parallel with each other but at an angle to the strips in the other ply, cementitious material uniting all of said strips, and gritty surfacing material adhering to the outer face of one of said plies.

4. A composite board comprising plies of pithy palmetto wood, each ply consisting of soft pithy material with coarse fibers therein, said plies being cemented to each other, a waterproof coating covering the outer face of one of said plies, and gritty surfacing material adhering to said coating.

5. As a new article of manufacture, a stiff board comprising plies of palmetto wood, each ply comprising strips of pithy material with coarse fibers formed therein, each strip having rough surfaces formed partly by the pithy material and partly by portions of the coarse fibers, a coating of protective material adhering to the rough outer face of each strip, and gritty surfacing material adhering to the coating on one of the outer faces of the board.

6. As a new article of manufacture, a stiff board comprising plies of palmetto wood, each ply comprising strips of pithy material with coarse fibers formed therein, each strip having rough surfaces formed partly by the pithy material and partly by portions of the coarse fibers, a coating of asphaltic material adhering to the rough surfaces of each strip, and gritty surfacing material adhering to the asphaltic coating on one of the outer faces of the board.

7. As a new article of manufacture, a stiff board comprising pithy material with coarse fibers therein, gritty surfacing material adhering to the mixture of fibers and pithy material on one side of the board, and a paper covering adhering to the other side of the board.

8. As a new article of manufacture, a board comprising plies of pithy palmetto wood, each ply consisting of hard coarse fibers in soft pithy material, cementitious material uniting the plies, gritty surfacing material adhering to the mixture of fibers and pithy material at one side of the board, and a paper covering adhering to the other side of the board.

In testimony that I claim the foregoing I hereunto affix my signature.

WILLIAM B. DOE.